United States Patent
Song et al.

(10) Patent No.: US 10,680,263 B2
(45) Date of Patent: Jun. 9, 2020

(54) METHODS AND SYSTEMS FOR OPERATING A REDOX FLOW BATTERY SYSTEM

(71) Applicant: ESS TECH, INC., Wilsonville, OR (US)

(72) Inventors: Yang Song, West Linn, OR (US); Evan Doremus, Portland, OR (US); Thiago Groberg, Tigard, OR (US)

(73) Assignee: ESS TECH, INC., Wilsonville, OR (US)

( * ) Notice: Subject to any disclaimer, the term of this patent is extended or adjusted under 35 U.S.C. 154(b) by 183 days.

(21) Appl. No.: 15/965,709

(22) Filed: Apr. 27, 2018

(65) Prior Publication Data

US 2018/0316032 A1 Nov. 1, 2018

Related U.S. Application Data (60) Provisional application No. 62/491,963, filed on Apr. 28, 2017.

(51) Int. Cl.
*H01M 8/18* (2006.01)
*H01M 8/04746* (2016.01)
(Continued)

(52) U.S. Cl.
CPC ... *H01M 8/04783* (2013.01); *H01M 8/04186* (2013.01); *H01M 8/04201* (2013.01);
(Continued)

(58) Field of Classification Search
CPC ......... H01M 8/188; H01M 8/18; H01M 8/184
See application file for complete search history.

(56) References Cited

U.S. PATENT DOCUMENTS

| 6,692,862 B1 | 2/2004 | Zocchi |
| 7,800,345 B2 | 9/2010 | Yun et al. |

(Continued)

FOREIGN PATENT DOCUMENTS

| KR | 20090046087 A | 5/2009 |
| WO | 2013027076 A1 | 2/2013 |

(Continued)

OTHER PUBLICATIONS

Song, Y. et al., "Methods and System for a Battery," U.S. Appl. No. 15/965,673, filed Apr. 27, 2018, 66 pages.
(Continued)

*Primary Examiner* — Olatunji A Godo
(74) *Attorney, Agent, or Firm* — McCoy Russell LLP (57) ABSTRACT

A method of operating a redox flow battery, may include maintaining a positive electrode compartment pressure greater than a negative electrode compartment pressure, and maintaining a cross-over pressure less than a membrane break-through pressure, wherein the cross-over pressure equals the negative electrode compartment pressure subtracted from the positive electrode compartment pressure. In this way, ionic resistance across the separator can be maintained at a lower level by reducing gas bubbles trapped therein while reducing separator break-through, thereby increasing performance of the redox flow battery system.

19 Claims, 5 Drawing Sheets

(51) Int. Cl.
    *H01M 8/04537*    (2016.01)
    *H01M 8/04082*    (2016.01)
    *H01M 8/04186*    (2016.01)

(52) U.S. Cl.
    CPC ... *H01M 8/04641* (2013.01); *H01M 8/04753* (2013.01); *H01M 8/188* (2013.01); *Y02E 60/528* (2013.01)

(56) References Cited

U.S. PATENT DOCUMENTS

| | | |
|---|---|---|
| 9,509,011 B2 | 11/2016 | Evans et al. |
| 2014/0127542 A1 | 5/2014 | Li et al. |
| 2015/0255824 A1 | 9/2015 | Evans et al. |
| 2016/0006054 A1 | 1/2016 | Li et al. |
| 2016/0093925 A1 | 3/2016 | Li et al. |
| 2016/0293992 A1 | 10/2016 | Song et al. |
| 2016/0315337 A1* | 10/2016 | Perry .................. H01M 8/188 |

FOREIGN PATENT DOCUMENTS

| | | | |
|---|---|---|---|
| WO | WO2015099728 | * | 7/2015 |
| WO | 2016117265 A1 | | 7/2016 |

OTHER PUBLICATIONS

Evans, C., "Methods and Systems for Rebalancing Electrolytes for a Redox Flow Battery System," U.S. Appl. No. 15/965,728, filed Apr. 27, 2018, 50 pages.

Song, Y. et al., "Integrated Hydrogen Recycle System Using Pressurized Multichamber Tank," U.S. Appl. No. 15/965,627, filed Apr. 27, 2018, 50 pages.

Song, Y. et al., "Methods and Systems for Redox Flow Battery Electrolyte Hydration," U.S. Appl. No. 15/965,671, filed Apr. 27, 2018, 56 pages.

Song, Y. et al., "Flow Battery Cleansing Cycle to Maintain Electrolyte Health and System Performance," U.S. Appl. No. 15/965,722, filed Apr. 27, 2018, 56 pages.

Teng, X. et al., "A high performance polytetrafluoroethene/Nafion composite membrane for vanadium redox flow battery application," Journal of Power Sources, vol. 240, Oct. 15, 2013, 9 pages.

Zhou, X. et al., "Performance of a vanadium redox flow battery with a VANADion membrane," Applied Energy, vol. 180, Oct. 15, 2016, 7 pages.

ISA Korean Intellectual Property Office, International Search Report Issued in Application No. PCT/US2018/030023, dated Aug. 29, 2018, WIPO, 2 pages.

* cited by examiner

METHODS AND SYSTEMS FOR OPERATING A REDOX FLOW BATTERY SYSTEM

CROSS REFERENCE TO RELATED APPLICATIONS

The present application claims priority to U.S. Provisional Application No. 62/491,963, entitled "Methods and Systems for Operating a Redox Flow Battery System", and filed on Apr. 28, 2017. The entire contents of the above-listed application are hereby incorporated by reference for all purposes.

ACKNOWLEDGMENT OF GOVERNMENT SUPPORT

This invention was made with government support under contract No. DEAR0000261 awarded by the DOE, Office of ARPA-E. The government has certain rights in the invention.

FIELD

The present description relates generally to methods and systems for operating a redox flow battery system.

BACKGROUND AND SUMMARY

Redox flow batteries are suitable for grid scale storage applications due to their capabilities of scaling power and capacity independently, and charging and discharging for thousands of cycles with reduced performance losses as compared with conventional battery technologies. Redox flow battery cells generally employ two different types of membrane separators: ion exchange membranes (IEMs) and microporous membranes. IEMs generally exhibit higher ion selectivity but higher resistivity and higher cost, while microporous membranes are less expensive and exhibit lower resistivities but are associated with poor ion selectivity. Operating with separators having low ion selectivities can lower overall efficiency of a redox flow battery.

Some redox flow batteries employ a hybrid separator, such as VANADion™-20 membranes, including both an IEM and a microporous membrane layer laminated side by side in order to attempt to exploit the higher ion selectivity of the IEM layer, while mitigating overall resistivity and cost with the microporous membrane layer.

The inventors herein have discovered various issues with the above systems. Namely, due to the hydrophobicity of the microporous membrane layer, the microporous membrane can be difficult to thoroughly wet with the aqueous electrolyte, and can become infiltrated with air and other gas bubbles diffusing therein. The presence of gas bubbles in the microporous membrane layer can cause substantial increases in resistivity of the redox flow cell battery, which lowers battery efficiency. Even with thorough wetting, redox flow battery cells including microporous membrane layers can often exhibit increased resistivity, especially during charging mode operation.

The issues described above may at least partially be addressed by a method of operating a redox flow battery, including maintaining a positive electrode compartment pressure greater than a negative electrode compartment pressure, and maintaining a cross-over pressure less than a membrane break-through pressure, wherein the cross-over pressure equals the negative electrode compartment pressure subtracted from the positive electrode compartment pressure.

In this way, ionic resistance across the separator can be maintained at a lower level by reducing gas bubbles trapped therein while reducing separator break-through, thereby increasing performance of the redox flow battery system.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Hybrid redox flow batteries are redox flow batteries that are characterized by the deposition of one or more of the electro-active materials as a solid layer on an electrode. Hybrid redox flow batteries may, for instance, include a chemical that plates via an electrochemical reaction as a solid on a substrate throughout the battery charge process. During battery discharge, the plated species may ionize via an electrochemical reaction, becoming soluble in the electrolyte. In hybrid battery systems, the charge capacity (e.g., amount of energy stored) of the redox battery may be limited by the amount of metal plated during battery charge and may accordingly depend on the efficiency of the plating system as well as the available volume and surface area available for plating.

Figure 1:
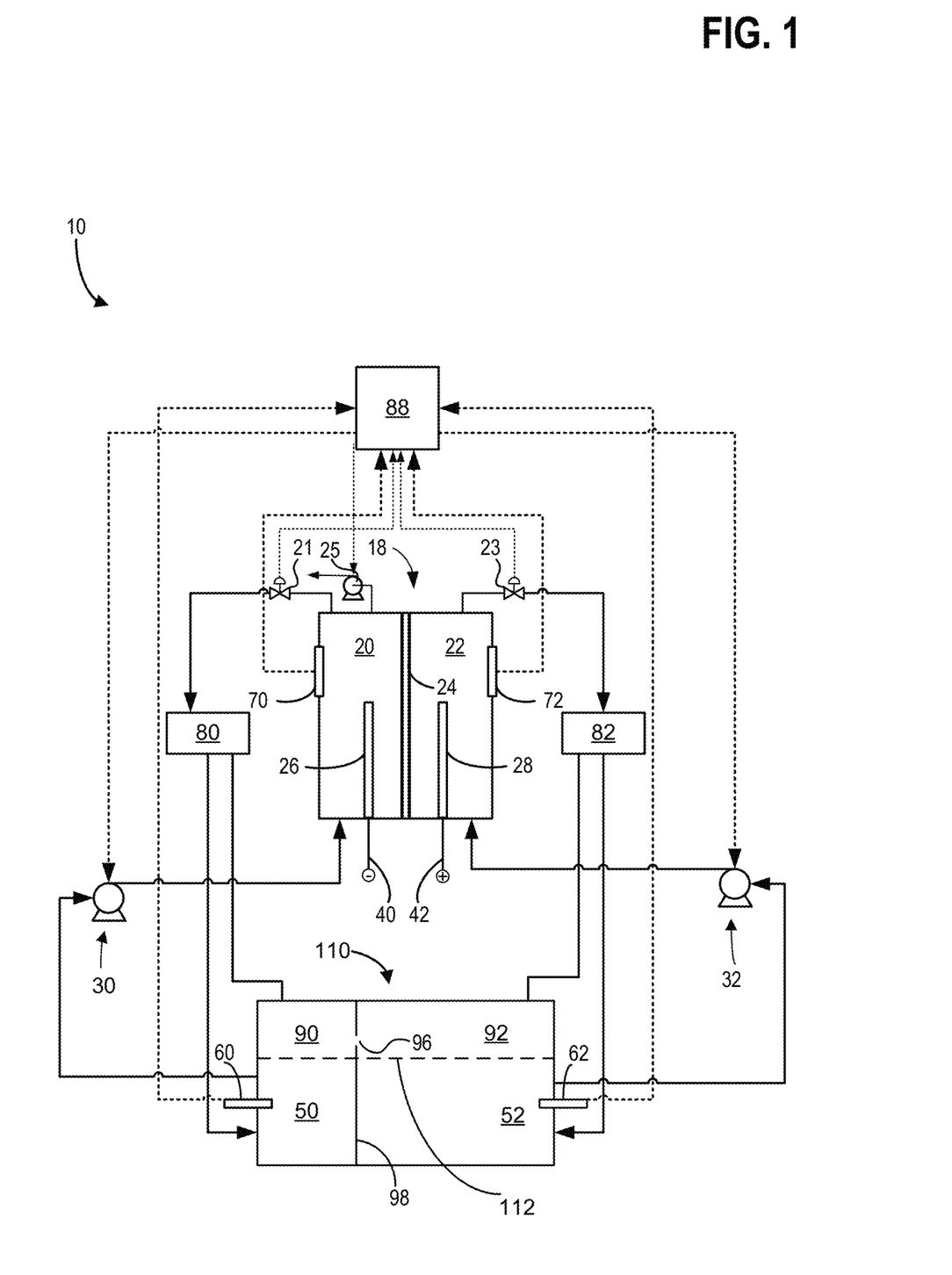
FIG. 1 shows a schematic of an example redox flow battery system.

In a redox flow battery system the negative electrode 26 may be referred to as the plating electrode and the positive electrode 28 may be referred to as the redox electrode. The negative electrolyte within the plating side (e.g., negative electrode compartment 20) of the battery may be referred to as the plating electrolyte and the positive electrolyte on the redox side (e.g. positive electrode compartment 22) of the battery may be referred to as the redox electrolyte.

Anode refers to the electrode where electro-active material loses electrons and cathode refers to the electrode where electro-active material gains electrons. During battery charge, the positive electrolyte gains electrons at the negative electrode 26; therefore the negative electrode 26 is the cathode of the electrochemical reaction. During discharge, the positive electrolyte loses electrons; therefore the negative electrode 26 is the anode of the reaction. Accordingly, during charge, the negative electrolyte and negative electrode may be respectively referred to as the catholyte and cathode of the electrochemical reaction, while the positive electrolyte and the positive electrode may be respectively referred to as the anolyte and anode of the electrochemical reaction. Alternatively, during discharge, the negative electrolyte and negative electrode may be respectively referred to as the anolyte and anode of the electrochemical reaction, while the positive electrolyte and the positive electrode may be respectively referred to as the catholyte and cathode of the electrochemical reaction. For simplicity, the terms positive and negative are used herein to refer to the electrodes, electrolytes, and electrode compartments in redox battery flow systems.

One example of a hybrid redox flow battery is an all iron redox flow battery (IFB), in which the electrolyte comprises iron ions in the form of iron salts (e.g., $FeCl_2$, $FeCl_3$, and the like), wherein the negative electrode comprises metal iron. For example, at the negative electrode, ferrous ion, $Fe^{2+}$, receives two electrons and plates as iron metal on to the negative electrode 26 during battery charge, and iron metal, $Fe^0$, loses two electrons and re-dissolves as $Fe^{2+}$ during battery discharge. At the positive electrode, $Fe^{2+}$ loses an electron to form ferric ion, $Fe^{3+}$, during charge, and during discharge $Fe^{3+}$ gains an electron to form $Fe^{2+}$: The electrochemical reaction is summarized in equations (1) and (2), wherein the forward reactions (left to right) indicate electrochemical reactions during battery charge, while the reverse reactions (right to left) indicate electrochemical reactions during battery discharge:

$$Fe^{2+} + 2e^- \leftrightarrow Fe^0 \quad -0.44 \text{ V (Negative Electrode)} \quad (1)$$

$$2Fe^{2+} \leftrightarrow 2Fe^{3+} + 2e^- \quad +0.77 \text{ V (Positive Electrode)} \quad (2)$$

As discussed above, the negative electrolyte used in the all iron redox flow battery (IFB) may provide a sufficient amount of $Fe^{2+}$ so that, during charge, $Fe^{2+}$ can accept two electrons from the negative electrode to form $Fe^0$ and plate onto a substrate. During discharge, the plated $Fe^0$ may then lose two electrons, ionizing into $Fe^{2+}$ and be dissolved back into the electrolyte. The equilibrium potential of the above reaction is −0.44V and thus this reaction provides a negative terminal for the desired system. On the positive side of the IFB, the electrolyte may provide $Fe^{2+}$ during charge, which loses electron and oxidizes to $Fe^{3+}$. During discharge, $Fe^{3+}$ provided by the electrolyte becomes $Fe^{2+}$ by absorbing an electron provided by the electrode. The equilibrium potential of this reaction is +0.77V, creating a positive terminal for the desired system.

The IFB provides the ability to charge and recharge its electrolytes in contrast to other battery types utilizing non-regenerating electrolytes. Charge is achieved by applying a current across the electrodes via terminals 40 and 42. The negative electrode may be coupled via terminal 40 to the negative side of a voltage source so that electrons may be delivered to the negative electrolyte via the positive electrode (e.g., as $Fe^{2+}$ is oxidized to $Fe^{3+}$ in the positive electrolyte in the positive electrode compartment 22). The electrons provided to the negative electrode 26 (e.g., plating electrode) can reduce the $Fe^{2+}$ in the negative electrolyte to form $Fe^0$ at the plating substrate causing it to plate onto the negative electrode.

Discharge can be sustained while $Fe^0$ remains available to the negative electrolyte for oxidation and while $Fe^{3+}$ remains available in the positive electrolyte for reduction. As an example, $Fe^{3+}$ availability can be maintained by increasing the concentration or the volume of the positive electrolyte to the positive electrode compartment 22 side of cell 18 to provide additional $Fe^{3+}$ ions via an external source, such as an external positive electrolyte tank or positive electrolyte chamber 52. More commonly, availability of $Fe^0$ during discharge may be an issue in IFB systems, wherein the $Fe^0$ available for discharge may be proportional to the surface area and volume of the negative electrode substrate as well as the plating efficiency. Charge capacity may be dependent on the availability of $Fe^{2+}$ in the negative electrode compartment 20. As an example, $Fe^{2+}$ availability can be maintained by providing additional $Fe^{2+}$ ions via an external source, such as an external negative electrolyte tank 50 to increase the concentration or the volume of the negative electrolyte to the negative electrode compartment 20 side of cell 18.

In an IFB, the positive electrolyte comprises ferrous ion, ferric ion, ferric complexes, or any combination thereof, while the negative electrolyte comprises ferrous ion or ferrous complexes, depending on the state of charge of the IFB system. As previously mentioned, utilization of iron ions in both the negative electrolyte and the positive electrolyte allows for utilization of the same electrolytic species on both sides of the battery cell, which can reduce electrolyte cross-contamination and can increase the efficiency of the IFB system, resulting in less electrolyte replacement as compared to other redox flow battery systems.

Efficiency losses in an IFB may result from electrolyte crossover through the separator 24 (e.g., ion-exchange membrane barrier, micro-porous membrane, and the like). For example, ferric ions in the positive electrolyte may be driven toward the negative electrolyte by a ferric ion concentration gradient and an electrophoretic force across the separator. Subsequently, ferric ions penetrating the membrane barrier and crossing over to the negative electrode compartment 20 may result in coulombic efficiency losses. Ferric ions crossing over from the low pH redox side (e.g., more acidic positive electrode compartment 22) to high pH plating side (e.g., less acidic negative electrode compartment 20) can result in precipitation of $Fe(OH)_3$. Precipitation of $Fe(OH)_3$ can damage the separator 24 and cause permanent battery performance and efficiency losses. For example, $Fe(OH)_3$ precipitate may chemically foul the organic functional group of an ion-exchange membrane or physically clog the small micro-pores of an ion-exchange membrane. In either case, due to the $Fe(OH)_3$ precipitate, membrane ohmic resistance may rise over time and battery performance may degrade. Precipitate may be removed by washing the battery with acid, but the constant maintenance and downtime may be disadvantageous for commercial battery applications. Furthermore, washing may be dependent on regular preparation of electrolyte, adding to process cost and complexity. Adding specific organic acids to the positive electrolyte and the negative electrolyte in response to electrolyte pH changes may also mitigate precipitate formation during battery charge and discharge cycling.

Additional coulombic efficiency losses may be caused by reduction of $H^+$ (e.g., protons) and subsequent formation of $H_2$ (e.g., hydrogen gas), and the reaction of protons in the negative electrode compartment 20 with electrons supplied at the plated iron metal electrode to form hydrogen gas.

The IFB electrolyte (e.g., $FeCl_2$, $FeCl_3$, $FeSO_4$, $Fe_2(SO_4)_3$, and the like) is readily available and can be produced at low costs. The IFB electrolyte offers higher reclamation value because the same electrolyte can be used for the negative electrolyte and the positive electrolyte, consequently reducing cross contamination issues as compared to other systems. Furthermore, owing to its electron configuration, iron may solidify into a generally uniform solid structure during plating thereof on the negative electrode substrate. For zinc and other metals commonly used in hybrid redox batteries, solid dendritic structures may form during plating. The stable electrode morphology of the IFB system may increase the efficiency of the battery in comparison to other redox flow batteries. Further still, iron redox flow batteries reduce the use of toxic raw materials and can operate at a relatively neutral pH as compared to other redox flow battery electrolytes. Accordingly, IFB systems reduce environmental hazards as compared with all other current advanced redox flow battery systems in production.

FIG. 1 provides a schematic illustration of a redox flow battery system 10. The redox flow battery system 10 may comprise a redox flow battery cell 18, fluidly connected to a multi-chambered electrolyte storage tank 110. The redox flow battery cell 18 may generally include a negative electrode compartment 20, separator 24, and positive electrode compartment 22. The separator 24 may comprise an electrically insulating ionic conducting barrier, which prevents bulk mixing of the positive electrolyte and the negative electrolyte while allowing conductance of specific ions therethrough. For example, the separator 24 may comprise an ion-exchange membrane and/or a microporous membrane. The negative electrode compartment 20 may comprise a negative electrode 26, and a negative electrolyte comprising electroactive materials. The positive electrode compartment 22 may comprise a positive electrode 28, and a positive electrolyte comprising electroactive materials. In some examples, multiple redox flow battery cells 18 may be combined in series or parallel to generate a higher voltage or current in a redox flow battery system. Further illustrated in FIG. 1 are negative and positive electrolyte pumps 30 and 32, both used to pump electrolyte solution through the flow battery system 10. Electrolytes are stored in one or more tanks external to the cell, and are pumped via negative and positive electrolyte pumps 30 and 32 through the negative electrode compartment 20 side and the positive electrode compartment 22 side of the battery, respectively.

As illustrated in FIG. 1, the redox flow battery cell 18 may further include negative battery terminal 40, and positive battery terminal 42. When a charge current is applied to the battery terminals 40 and 42, the positive electrolyte is oxidized (lose one or more electrons) at the positive electrode 28, and the negative electrolyte is reduced (gain one or more electrons) at the negative electrode 26. During battery discharge, reverse redox reactions occur on the electrodes. In other words, the positive electrolyte is reduced (gain one or more electrons) at the positive electrode 28, and the negative electrolyte is oxidized (lose one or more electrons) at the negative electrode 26. The electrical potential difference across the battery is maintained by the electrochemical redox reactions in the positive electrode compartment 22 and the negative electrode compartment 20, and can induce a current through a conductor while the reactions are sustained. The amount of energy stored by a redox battery is limited by the amount of electro-active material available in electrolytes for discharge, depending on the total volume of electrolytes and the solubility of the electro-active materials.

The flow battery system 10 may further comprise an integrated multi-chambered electrolyte storage tank 110. The multi-chambered storage tank 110 may be divided by a bulkhead 98. The bulkhead 98 may create multiple chambers within the storage tank so that both the positive and negative electrolyte may be included within a single tank. The negative electrolyte chamber 50 holds negative electrolyte comprising electroactive materials, and the positive electrolyte chamber 52 holds positive electrolyte comprising electroactive materials. The bulkhead 98 may be positioned within the multi-chambered storage tank 110 to yield a desired volume ratio between the negative electrolyte chamber 50 and the positive electrolyte chamber 52. In one example, the bulkhead 98 may be positioned to set the volume ratio of the negative and positive electrolyte chambers according to the stoichiometric ratio between the negative and positive redox reactions. The figure further illustrates the fill height 112 of storage tank 110, which may indicate the liquid level in each tank compartment. The figure also shows gas head space 90 located above the fill height 112 of negative electrolyte chamber 50, and gas head space 92 located above the fill height 112 of positive electrolyte chamber 52. The gas head space 92 may be utilized to store hydrogen gas generated through operation of the redox flow battery (e.g., due to proton reduction and corrosion side reactions) and conveyed to the multi-chambered storage tank 110 with returning electrolyte from the redox flow battery cell 18. The hydrogen gas may be separated spontaneously at the gas-liquid interface (e.g., fill height 112) within the multi-chambered storage tank 110, thereby precluding having additional gas-liquid separators as part of the redox flow battery system. Once separated from the electrolyte, the hydrogen gas may fill the gas head spaces 90 and 92. A such, the stored hydrogen gas can aid in purging other gases from the multi-chamber storage tank 100, thereby acting as an inert gas blanket for reducing oxidation of electrolyte species, which can help to reduce redox flow battery capacity losses. In this way, utilizing the integrated multi-chambered storage tank 110 may forego having separate negative and positive electrolyte storage tanks, hydrogen storage tanks, and gas-liquid separators common to conventional redox flow battery systems, thereby simplifying the system design, reducing the physical footprint of the system, and reducing system costs.

FIG. 1 also shows the spill over-hole 96, which creates an opening in the bulkhead 98 between gas head spaces 90 and 92, and provides a means of equalizing gas pressure between the two chambers. The spill over hole 96 may be positioned at a threshold height above the fill height 112. The spill over hole further enables a capability to self-balance the electrolytes in each of the positive and negative electrolyte chambers in the event of a battery crossover. In the case of an all iron redox flow battery system, the same electrolyte ($Fe^{2+}$) is used in both negative and positive electrode compartments 20 and 22, so spilling over of electrolyte between the negative and positive electrolyte chambers 50 and 52 may reduce overall system efficiency, but the overall electrolyte composition, battery module performance, and battery module capacity are maintained. Flange fittings may be utilized for all piping connections for inlets and outlets to and from the multi-chambered storage tank 110 to maintain a continuously pressurized state without leaks. The multi-chambered storage tank can include at least one outlet from each of the negative and positive electrolyte chambers, and at least one inlet to each of the negative and positive electrolyte chambers. Furthermore, one or more outlet connections may be provided from the gas head spaces 90 and 92 for directing hydrogen gas to rebalancing reactors 80 and 82.

Although not shown in FIG. 1, integrated multi-chambered electrolyte storage tank 110 may further include one or more heaters thermally coupled to each of the negative electrolyte chamber 50 and the positive electrolyte chamber 52. In alternate examples, only one of the negative and positive electrolyte chambers may include one or more heaters. In the case where only the positive electrolyte chamber includes one or more heaters, the negative electrolyte may be heated by transferring heat generated at the battery cells of the power module to the negative electrolyte. In this way, the battery cells of the power module may heat and facilitate temperature regulation of the negative electrolyte. The one or more heaters may be actuated by the controller 88 to regulate a temperature of the negative electrolyte chamber 50 and the positive electrolyte chamber independently or together. For example, in response to an electrolyte temperature decreasing below a threshold temperature, the controller may increase a power supplied to one or more heaters so that a heat flux to the electrolyte is increased. The electrolyte temperature may be indicated by one or more temperature sensors mounted at the multi-chambered electrolyte storage tank 110, including sensors 60 and 62. As examples the one or more heaters may include coil type heaters or other immersion heaters immersed in the electrolyte fluid, or surface mantle type heaters that transfer heat conductively through the walls of the negative and positive electrolyte chambers to heat the fluid therein. Other known types of tank heaters may be employed without departing from the scope of the present disclosure. Furthermore, controller 88 may deactivate one or more heaters in the negative and positive electrolyte chambers in response to a liquid level decreasing below a solids fill threshold level. Said in another way, controller 88 may activate the one or more heaters in the negative and positive electrolyte chambers only in response to a liquid level increasing above the solids fill threshold level. In this way, activating the one or more heaters without sufficient liquid in the positive and/or negative electrolyte chambers can be averted, thereby reducing a risk of overheating or burning out the heaters.

Further illustrated in FIG. 1, electrolyte solutions typically stored in the multi-chambered storage tank 110 are pumped via negative and positive electrolyte pumps 30 and 32 throughout the flow battery system 10. Electrolyte stored in negative electrolyte chamber 50 is pumped via negative electrolyte pump 30 through the negative electrode compartment 20 side, and electrolyte stored in positive electrolyte chamber 52 is pumped via positive electrolyte pump 32 through the positive electrode compartment 22 side of the battery.

Two electrolyte rebalancing reactors 80 and 82, may be connected in-line or in parallel with the recirculating flow paths of the electrolyte at the negative and positive sides of the battery, respectively, in the redox flow battery system 10. One or more rebalancing reactors may be connected in-line with the recirculating flow paths of the electrolyte at the negative and positive sides of the battery, and other rebalancing reactors may be connected in parallel, for redundancy (e.g., a rebalancing reactor may be serviced without disrupting battery and rebalancing operations) and for increased rebalancing capacity. In one example, the electrolyte rebalancing reactors 80 and 82 may be placed in the return flow path from the positive and negative electrode compartments 20 and 22 to the positive and negative electrolyte chambers 50 and 52, respectively. Electrolyte rebalancing reactors 80 and 82 may serve to rebalance electrolyte charge imbalances in the redox flow battery system occurring due to side reactions, ion crossover, and the like, as described herein. In one example, electrolyte rebalancing reactors 80 and 82 may include trickle bed reactors, where the hydrogen gas and electrolyte are contacted at catalyst surfaces in a packed bed for carrying out the electrolyte rebalancing reaction. In other examples the rebalancing reactors 80 and 82 may include flow-through type reactors that are capable of contacting the hydrogen gas and the electrolyte liquid and carrying out the rebalancing reactions in the absence of a packed catalyst bed.

During operation of a redox flow battery system, sensors and probes may monitor and control chemical properties of the electrolyte such as electrolyte pH, concentration, state of charge, and the like. For example, as illustrated in FIG. 1, sensors 62 and 60 maybe be positioned to monitor positive electrolyte and negative electrolyte conditions at the positive electrolyte chamber 52 and the negative electrolyte chamber 50, respectively. As another example, sensors 72 and 70, also illustrated in FIG. 1, may monitor positive electrolyte and negative electrolyte conditions at the positive electrode compartment 22 and the negative electrode compartment 20, respectively. In one example, sensors 70 and 72 may include pressure sensors that transmit signals to the controller 88 indicating the pressure at the negative and positive sides of the separator 24 of the redox flow battery cell 18. The pressure at the negative and positive electrode compartments 20 and 22 of the separator 24 may be regulated by controlling the inlet and outlet flows of negative and positive electrolyte thereto, respectively. For example, the controller may decrease a pressure at the negative electrode compartment 20 by one or more of increasing a pump speed of a vacuum pump 25 fluidly coupled to thereto, reducing a pump speed of the negative electrolyte pump 30, and by throttling a back pressure flow regulator 21 to increase an outlet flow from the negative electrode compartment.

Similarly, the controller may increase a pressure at the positive electrode compartment 22 by one or more of increasing a pump speed of the positive electrolyte pump 32, and by throttling a back pressure flow regulator 23 to decrease an outlet flow from the negative electrode compartment. Back pressure flow regulators 21 and 23 may include orifices, valves, and the like. For example, controller 88 may send a signal to position a valve 21 to a more open position, to induce higher outlet flows from negative electrode compartment 20, thereby reducing a negative electrode compartment pressure. Increasing the positive electrode compartment pressure (non-gas generating side of the redox flow battery) and decreasing the pressure in the negative electrode compartment (gas generating side of the redox flow battery) may aid in increasing a cross-over pressure (positive over negative) across the separator 24. In other words, a positive cross-over pressure may refer to a pressure at a non-gas generating side of the redox flow battery being greater than a pressure at a gas generating side of the redox flow battery. Having a positive cross-over pressure can then alleviate infiltration of gas bubbles generated at the gas generating side of the battery into the membrane. In the case of an IFB, hydrogen gas is produced by way of side reactions at the negative side of the IFB so the negative side of an IFB may correspond to the gas generating side of the battery. Increasing the cross-over pressure by increasing the flow of the positive electrolyte by increasing the pump speed of the positive electrolyte pump 32 and increasing back pressure at the outlet of the positive electrode compartment 22 may be less desirable than other methods of increasing the cross-over pressure because pump parasitic losses may be increased.

Sensors may be positioned at other locations throughout the redox flow battery system to monitor electrolyte chemical properties and other properties. For example a sensor may be positioned in an external acid tank (not shown) to monitor acid volume or pH of the external acid tank, wherein acid from the external acid tank is supplied via an external pump (not shown) to the redox flow battery system in order to reduce precipitate formation in the electrolytes. Additional external tanks and sensors may be installed for supplying other additives to the redox flow battery system 10. For example, various sensor including, temperature, pressure, conductivity, and level sensors of a field hydration system may transmit signals to the controller 88 when hydrating a redox flow battery system in a dry state. Furthermore, controller 88 may send signals to actuators such as valves and pumps of the field hydration system during hydration of the redox flow battery system. Sensor information may be transmitted to a controller 88 which may in turn actuate pumps 30 and 32 to control electrolyte flow through the cell 18, or to perform other control functions, as an example. In this manner, the controller 88 may be responsive to, one or a combination of sensors and probes. Redox flow battery cell 18 may be positioned within one of a plurality of redox flow battery cell stacks of a power module for a redox flow battery system. Each of the redox flow battery cells 18 in a redox flow battery cell stack may be electrically connected in series and/or parallel with a plurality of other redox flow battery cells in the redox flow battery cell stack. Furthermore each of the redox flow battery cell stacks may be electrically connected in series and/or parallel with a plurality of the other redox flow battery cell stacks in the power module. In this way, the redox flow battery cell stacks may be electrically combined to supply power from the power module.

Redox flow battery system 10 may further comprise a source of hydrogen gas. In one example the source of hydrogen gas may comprise a separate dedicated hydrogen gas storage tank. In the example of FIG. 1, hydrogen gas may be stored in and supplied from the integrated multi-chambered electrolyte storage tank 110. Integrated multi-chambered electrolyte storage tank 110 may supply additional hydrogen gas to the positive electrolyte chamber 52 and the negative electrolyte chamber 50. Integrated multi-chambered electrolyte storage tank 110 may alternately supply additional hydrogen gas to the inlet of electrolyte rebalancing reactors 80 and 82. As an example, a mass flow meter or other flow controlling device (which may be controlled by controller 88) may regulate the flow of the hydrogen gas from integrated multi-chambered electrolyte storage tank 110.

The integrated multi-chambered electrolyte storage tank 110 may supplement the hydrogen gas generated in redox flow battery system 10. For example, when gas leaks are detected in redox flow battery system 10 or when the reduction reaction rate is too low at low hydrogen partial pressure, hydrogen gas may be supplied from the integrated multi-chambered electrolyte storage tank 110 in order to rebalance the state of charge of the electro-active species in the positive electrolyte and negative electrolyte. As an example, controller 88 may supply hydrogen gas from integrated multi-chambered electrolyte storage tank 110 in response to a measured change in pH or in response to a measured change in state of charge of an electrolyte or an electro-active species. For example an increase in pH of the negative electrolyte chamber 50, or the negative electrode compartment 20, may indicate that hydrogen is leaking from the redox flow battery system 10 and/or that the reaction rate is too slow with the available hydrogen partial pressure. In response to the pH increase, controller 88 may increase a supply of hydrogen gas from integrated multi-chambered electrolyte storage tank 110 to the redox flow battery system 10. As a further example, controller 88 may supply hydrogen gas from integrated multi-chambered electrolyte storage tank 110 in response to a pH change, wherein the pH increases beyond a first threshold pH or decreases beyond a second threshold pH. In the case of an IFB, controller 88 may supply additional hydrogen to increase the rate of reduction of ferric ions and the rate of production of protons, thereby reducing the pH of the positive electrolyte. Furthermore, the negative electrolyte pH may be lowered by hydrogen reduction of ferric ions crossing over from the positive electrolyte to the negative electrolyte or by proton generated at the positive side crossing over to the negative electrolyte due to a proton concentration gradient and electrophoretic forces. In this manner, the pH of the negative electrolyte may be maintained within a stable region, while reducing the risk of precipitation of ferric ions (crossing over from the positive electrode compartment) as $Fe(OH)_3$.

Other control schemes for controlling the supply rate of hydrogen gas from integrated multi-chambered electrolyte storage tank 110 responsive to a change in an electrolyte pH or to a change in an electrolyte state of charge, detected by other sensors such as an oxygen-reduction potential (ORP) meter or an optical sensor, may be implemented. Further still, the change in pH or state of charge triggering the action of controller 88 may be based on a rate of change or a change measured over a time period. The time period for the rate of change may be predetermined or adjusted based on the time constants for the redox flow battery system. For example the time period may be reduced if the recirculation rate is high, and local changes in concentration (e.g., due to side reactions or gas leaks) may quickly be measured since the time constants may be small.

Turning now to FIGS. 2A-2D, they illustrate partial detail views of an example redox flow battery cell 200, including a negative electrode compartment 210 with negative electrolyte 270 flowing therethrough, and a positive electrode compartment 220 with positive electrolyte 280 flowing therethrough. Negative electrode compartment 210 and positive electrode compartment 220 may correspond to negative electrode compartment 20 and positive electrode compartment 22, respectively, of redox flow battery system 10. A bulk flow direction of the negative electrolyte 270 and the positive electrolyte 280 is indicated by arrows 272 and 282, respectively. A separator 230 interposed between the positive and negative electrode compartments 210 and 220 includes a hydrophobic (e.g., oil-based or non oil-based but with small pore size) microporous membrane layer 234 facing the negative electrode compartment 210 positioned adjacent to an ion-exchange membrane (IEM) layer 236 facing the positive electrode compartment 220. In other words, the negative electrolyte 270 flows adjacent to the microporous membrane layer 234 and the positive electrolyte 280 flows adjacent to the IEM layer 236. Furthermore, the separator may be a hybrid membrane exhibiting both hydrophobic and hydrophilic surface properties. In one example, the ion exchange membrane may include a Nafion membrane. In another example, the separator 230 may comprise a hybrid membrane, which coats the microporous substrate with a layer of IEM, which may be similar to IEM layer 236.

Figure 2A:
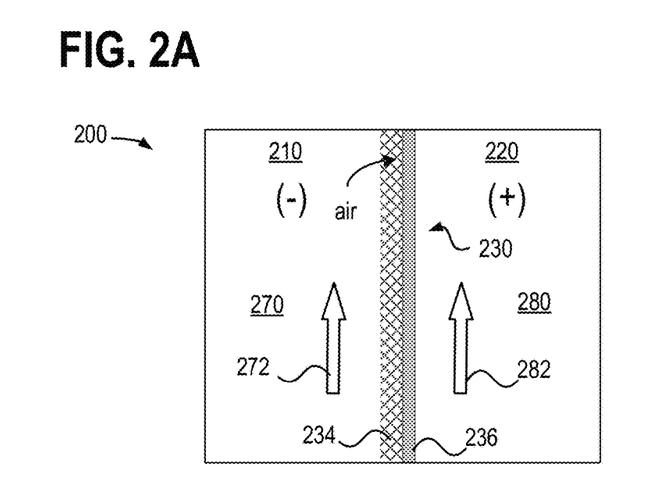
FIGS. 2A-2D show detail views of a redox flow battery cell.
Figure 2B:
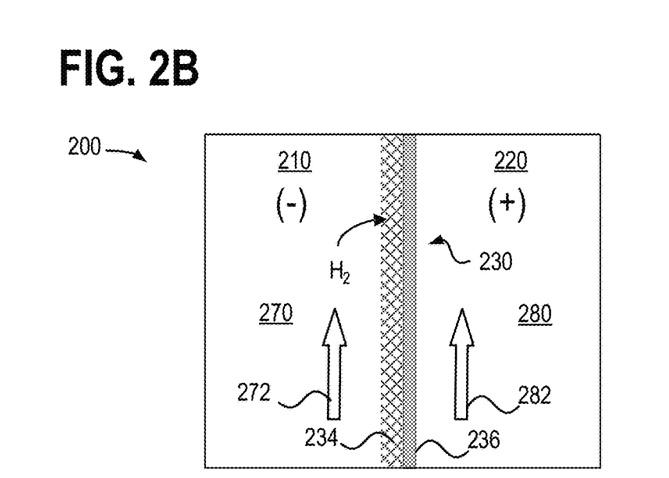

FIG. 2A illustrates the case where both the negative electrode compartment 210 and the positive electrode compartment 220 are filled with negative electrolyte 270 and positive electrolyte 280, respectively, including a battery cell start-up condition when electrolytes are introduced to the battery cell previously in a dry state. Owing to its hydrophobicity (or owing to the capillary force exerted from the small pores), the microporous membrane layer 234 may be incompletely wetted and thus can include trapped air within its pores when it is first wetted from a dry state. The presence of gas within the microporous membrane layer 230 can increase an ionic resistance of the separator 230, thereby reducing ion mobility across the separator 230. As a result, the efficiency and performance of the redox flow battery system may be lowered due to the presence of air in the microporous membrane layer 234. Furthermore, as illustrated in FIG. 2B, during charging of the redox flow battery cell, side reactions (e.g., reduction of hydrogen protons and metal corrosion) occurring in the negative electrode compartment 210 produce hydrogen gas which can become trapped inside the microporous membrane layer 234. The presence of hydrogen gas inside the microporous membrane layer 234 may further increase a resistance across the separator 230.

Figure 2C:
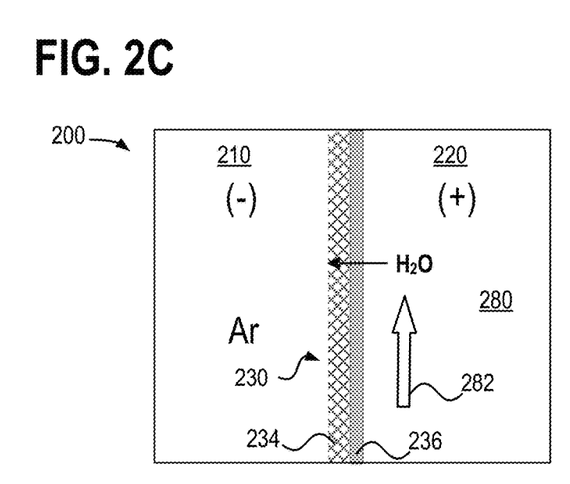

FIG. 2C illustrates a redox flow battery cell with the negative electrolyte 270 drained from the negative electrode compartment 210, and filled with an inert gas such as argon (Ar) and/or air, similar to a condition during draining of the battery cell where negative electrolyte is drained first. Because the positive electrode compartment 220 is filled with aqueous positive electrolyte 280, a positive hydraulic pressure is exerted across the separator 230 from the positive electrode compartment 220 to the negative electrode compartment 210. Consequently, water may be forced across the IEM layer 236 and can aid in purging gas (e.g., air, hydrogen) from the microporous membrane layer 234. This purging of gas from the microporous membrane layer 234 can account for performance step-increases (e.g., higher charging and discharging rates) observed for redox flow battery cells following draining of the negative electrode compartment 210. Accordingly, operating a redox flow battery with a positive cross-over pressure, whereby a pressure in the positive electrode compartment is maintained greater than a pressure in the negative electrode compartment, can aid in purging gas from a microporous membrane layer 234 of a redox flow battery cell separator 230, thereby reducing a resistivity of the redox flow battery cell. Maintaining a positive cross-over pressure may be performed by one or more of increasing a pressure in the positive electrode compartment 220 and decreasing a pressure in the negative electrode compartment 210, as described above with reference to FIG. 1.

Figure 2D:
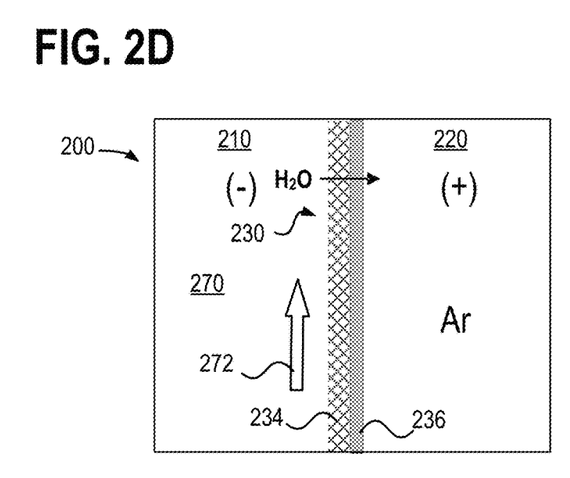

Conversely, FIG. 2D illustrates a redox flow battery cell with the positive electrolyte 280 drained from the positive electrode compartment 220, and filled with an inert gas such as argon (Ar) and/or air, similar to a condition during draining of the battery cell where positive electrolyte is drained first. Because the negative electrode compartment 210 is filled with aqueous positive electrolyte 280, a positive hydraulic pressure is exerted across the separator 230 from the negative electrode compartment 210 to the positive electrode compartment 220. Consequently, the hydrophilic IEM layer 236 may wick water from the hydrophobic microporous membrane layer 234. However, because of the hydrophobic nature of the microporous membrane layer 234, the wetting of the microporous membrane layer 234 with water from the negative electrode compartment 210 may be much slower than water drying from IEM. In other words, the rate of mass transfer of water from the microporous membrane layer 234 to the IEM layer 236 may be significantly higher than the rate of mass transfer of water from the negative electrolyte 270 to the microporous membrane layer 234. As a result, under the conditions of FIG. 2D, the resistance across the stack can be observed to sharply and promptly increase, and may decrease only after a lengthy duration of filling and circulating negative electrolyte 270 through the negative electrode compartment 210 to rewet the microporous membrane layer 234. Accordingly, operating a redox flow battery with a negative cross-over pressure, whereby a pressure in the positive electrode compartment is maintained less than a pressure in the negative electrode compartment, can increase a resistivity of the redox flow battery cell, thereby reducing performance of the redox flow battery.

Figure 3:
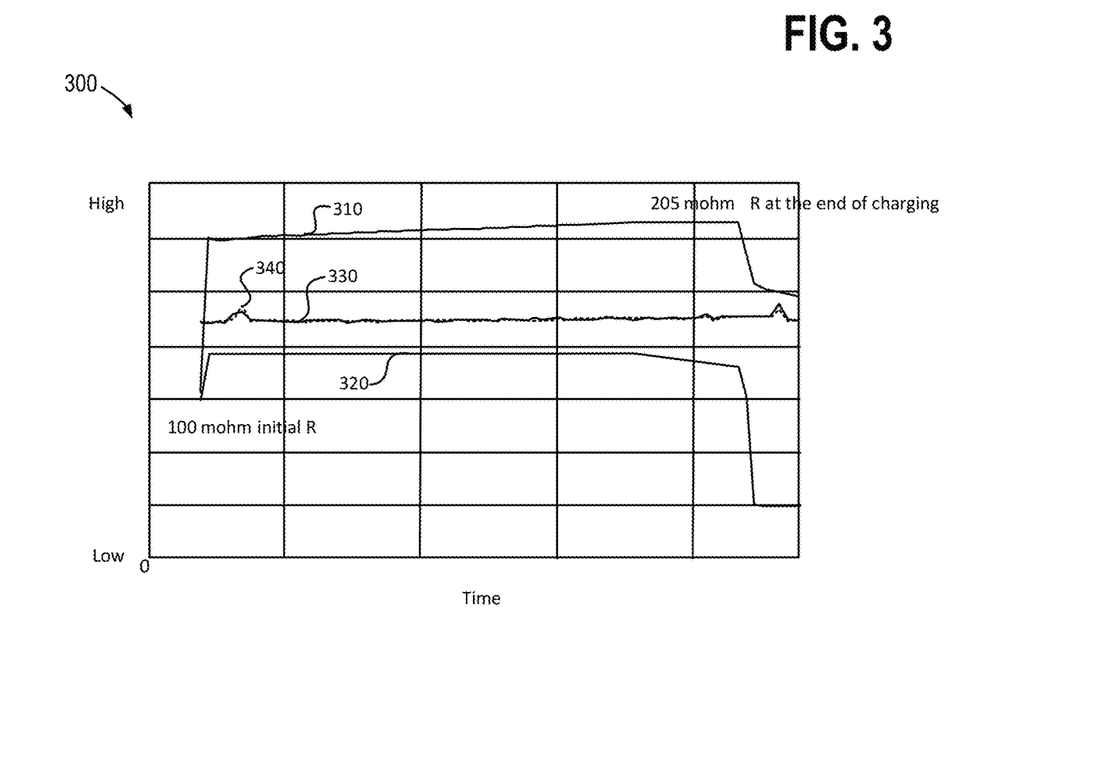
FIGS. 3-4 are example data plots showing redox flow battery system operating conditions, including a redox flow battery resistance.

FIG. 3 presents a data plot 300 which shows various test operating conditions of a redox flow battery system, including a power module voltage 310, current 320, positive inlet pressure 330, and negative inlet pressure 340. As shown in the figure, the positive inlet pressure 330 and the negative inlet pressure 340 (corresponding to pressures at the positive side of the separator and the negative side of the separator, respectively) were approximately equivalent during operation of the redox flow battery system. In other words, there was negligible pressure differential or cross-over pressure from the positive to the negative side of the membrane during the test operation. As such, plots of the positive inlet pressure 330 and negative inlet pressure 340 may overlay one another along portions of the data plot 300 where the two values are substantially equal. Electrical resistance can be calculated by dividing voltage 310 by the current 320, and the internal resistance graph 300 thereby allows the visualization of resistance over time. During the operating test, a redox flow battery system power module was operating for 65 minutes during which the internal resistance increased from 100 mohm initially, to 205 mohm. The increase in the internal resistance to nearly double the initial resistance is believed to be due to the presence of gas bubbles in the pores of the separator. As described with reference to FIGS. 2A-D, hydrogen gas generated from side reactions at the negative electrolyte on the hydrophobic side of the separator migrates into the membrane pores during charging and causes decreased ion mobility through the membrane. This increase in internal resistance is problematic as it decreases the overall efficiency of the battery module.

Figure 4:
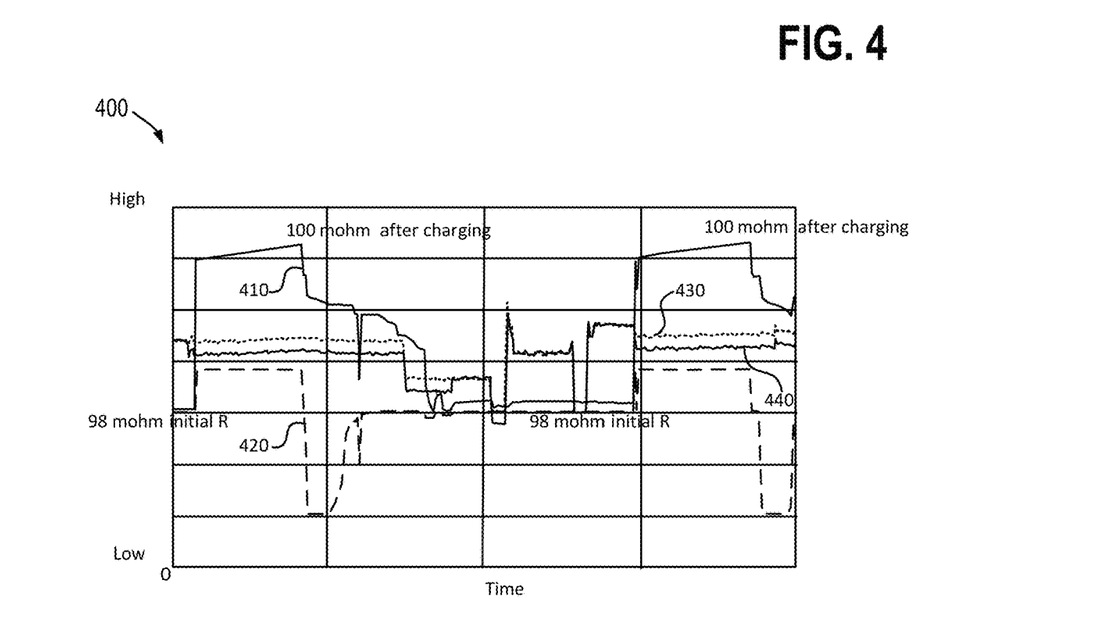

FIG. 4 illustrates another data plot 400 which shows various test operating conditions of a redox flow battery system, including a power module voltage 410, current 420, positive inlet pressure 430, and negative inlet pressure 440. Electrical resistance can be calculated by dividing voltage by current, and the internal resistance graph 400 thereby allows the visualization of resistance over time. During these test conditions, the power module is run for approximately one hour with a positive over negative pressure differential or cross-over pressure of 5 kPa, as shown by the positive inlet pressure 430 being higher than the negative inlet pressure 440. During the test operation, the power module internal resistance was maintained at the initial internal resistance of about 100 mohms. As described above with reference to FIGS. 2A-2D, having a higher electrolyte pressure on the positive side of the stack pushes water through the separator, thereby purging any hydrogen gas bubbles that may have infiltrated therein. Accordingly, increases in resistance, as observed when operating the redox flow battery system when the cross-over pressure is negligible (e.g., FIG. 3), can be mitigated. Operating the redox flow battery system when the internal resistance of the power module is lower is beneficial as it can increase the overall efficiency of a battery module.

Figure 5:
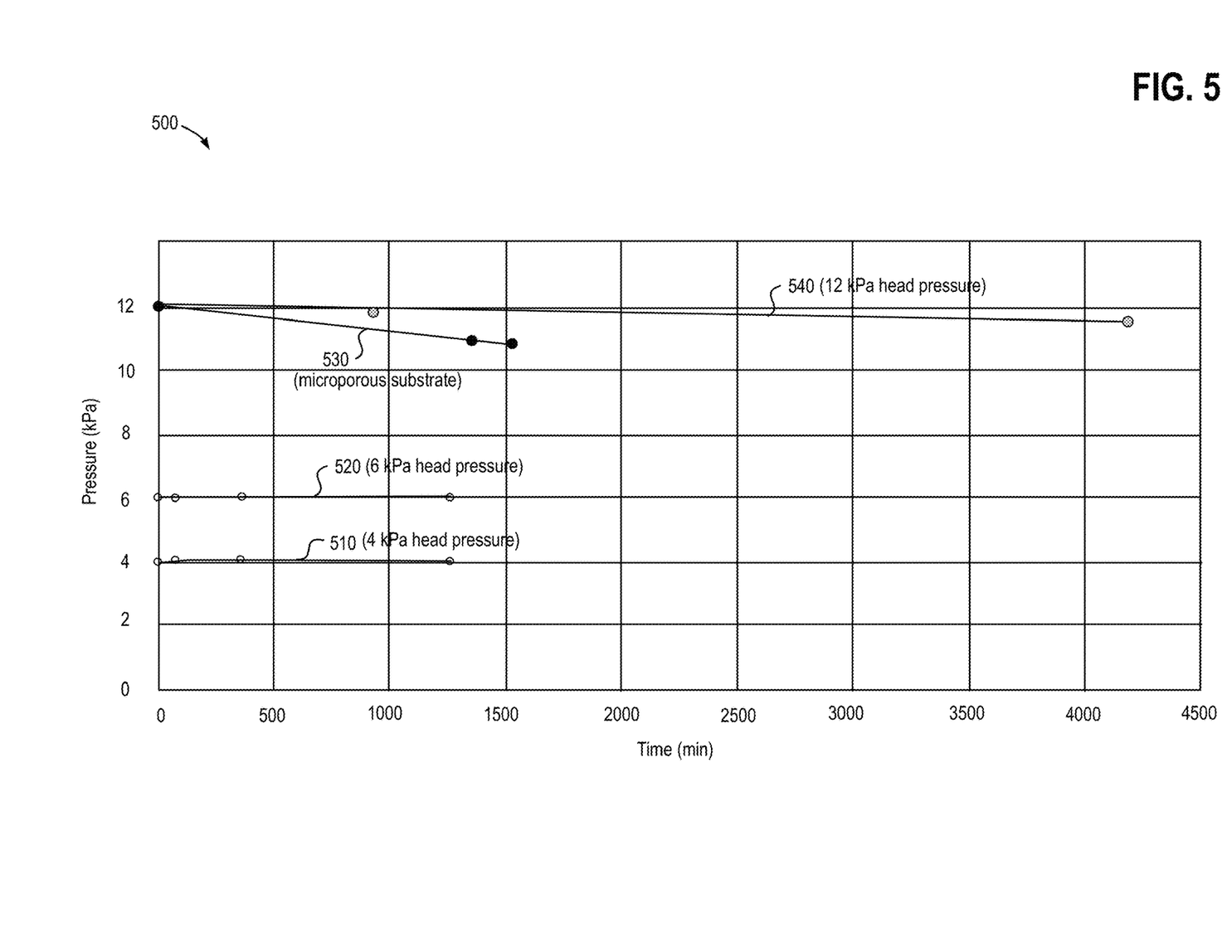
FIG. 5 shows a pressure permeability plot for an example redox flow battery cell membrane.

FIG. 5 illustrates a plot 500 indicating a water column permeability pressure test for a wet hybrid membrane (510, 520, and 540) and an uncoated microporous membrane (530). In particular, a column height indicates a hydrostatic pressure applied to the membrane at time 0. Various water pressures of 4 kPa (510), 6 kPa (520), and 12 kPa (530, 540) were applied to the membrane. The data corresponding to 4 kPa applied pressure 510 shows that after approximately 1250 minutes, there was no pressure loss, suggesting that 4 kPa was below the membrane permeability pressure (break-through pressure). Operating below a membrane break-through pressure can aid in reducing ionic mixing between the positive and negative electrolyte of a redox flow battery cell. Similarly, the data corresponding to 6 kPa applied pressure 520 shows that after approximately 1250 minutes there was no pressure loss, suggesting that 6 kPa was below the membrane break-through pressure. In contrast, the data corresponding to 12 kPa applied pressure 530 and 540 show a continuous loss of pressure (indicated by a loss in water column height) beginning immediately at time 0, which suggests that water is breaking through the membrane at 12 kPa. In other words, 12 kPa is greater than the break-through pressure of the membrane. Utilizing a microporous substrate without coating (530) seems to reduce membrane performance by increasing the rate of break-through of water through the membrane, as shown by the faster rate of decrease in column height for 530 as compared to 540. Accordingly, a break-through pressure for the membrane can be determined to be between 6 kPa and 12 kPa. Further tests at pressures intermediate to 6 and 12 kPa may be performed to more precisely evaluate the break-through pressure. Accordingly, operating the redox flow battery cells above a threshold pressure difference across the separator, but below the break-through pressure can reduce infiltration of gas into the membrane pores, thereby maintaining an internal resistance of the redox flow battery, while mitigating membrane break-through.

Figure 6:
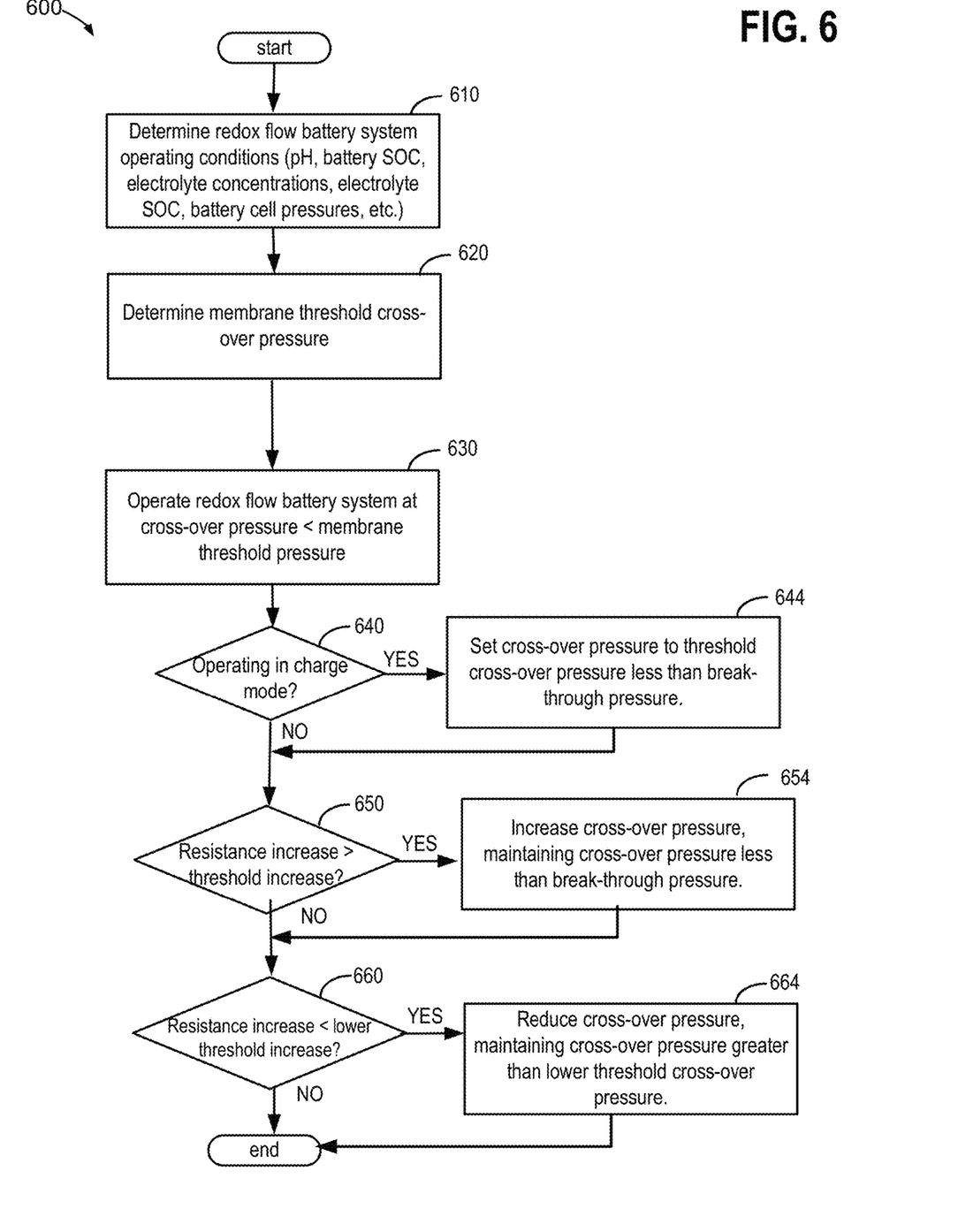
FIG. 6 shows a flow chart for an example method of operating a redox flow battery system.

Turning now to FIG. 6, it illustrates a method 600 of operating a redox flow battery system, including the redox flow battery system 10. The method 600 may be performed by a controller 88 as executable instructions stored in memory on board the controller 88. While performing method 600, controller 88 may receive signals from various sensors and instruments such as level, temperature, pressure, flow meters, and conductivity sensors, and the like, responsively transmit signals to actuate various devices such as pumps, valves, heater, and the like, of redox flow battery system 10. FIG. 6 begins at 610 where the controller 88 determines various operating conditions of the redox flow battery system such as pH, battery SOC, electrolyte concentrations, negative and positive electrode compartment pressures of a redox flow battery cell, and the like.

Next, at 620 method 600 determines a threshold cross-over pressure of the separator 24. In one example, the threshold cross-over pressure may correspond to a membrane break-through pressure. The membrane break-through pressure can be predetermined in off-line tests, such as subjecting the separator 24 to a water column pressure test, as described with reference to FIG. 5. In other examples, a break-through pressure may be determined through pilot-scale or lab-scale tests of a redox flow battery cell. For example, cross-over pressures can be gradually increased during operation of a pilot redox flow battery cell and a break-through pressure can be indicated when electrolyte mixing and a reduction in battery charging/discharging efficiency is observed. In other examples, a threshold cross-over pressure may correspond to a pressure less than the membrane break-through pressure. For example, the threshold cross-over pressure may be set to a fraction of the break-through pressure, or may be set to a pressure lower than the break-through pressure by a threshold membrane pressure difference. In this way break-through events can be mitigated, such as during pressure spikes, or due to degradation of the membrane and changes in permeability with time. In this way, a risk of membrane break-through during operation of the redox flow battery system can be reduced.

Method 600 continues at 630 where the redox flow battery system is operated at cross-over pressures (positive side pressure greater than the negative side) less than the membrane threshold pressure. Said another way, a non-gas generating side pressure is greater than a gas generating side pressure. The cross-over pressure may be selected to be a predetermined fraction of the membrane threshold pressure. For example, the cross-over pressure may be 60 to 80% of the membrane threshold pressure. Alternatively, the cross-over pressure may be selected to be lower than the cross-over pressure by a predetermined pressure difference. For example, the cross-over pressure may be selected to be lower than the cross-over pressure by 2 kPa. The cross-over pressure may be regulated by controlling the flow rates of negative and positive electrolytes into and out of the redox flow battery cell 18. For example, the cross-over pressure may be increased by one or more of increasing the pump speed of positive electrolyte pump 32, decreasing the pump speed of negative electrolyte pump 30, increasing the back pressure at the outlet of the positive electrode compartment 22 (e.g., by throttling back pressure flow regulator 23), reducing back pressure at the outlet of the negative electrode compartment 20, and increasing a vacuum at the negative side of the redox flow battery cell (e.g., by increasing a speed of a vacuum pump 25 fluidly connected thereto). Conversely, the cross-over pressure may be decreased by one or more of decreasing the pump speed of positive electrolyte pump 32, increasing the pump speed of negative electrolyte pump 30, decreasing the back pressure at the outlet of the negative electrode compartment 20 (e.g., by throttling back pressure flow regulator 21), increasing back pressure at the outlet of the negative electrode compartment 20, and decreasing a vacuum at the negative side of the redox flow battery cell (e.g., by decreasing a speed of a vacuum pump 25 fluidly connected thereto). Increasing the cross-over pressure by increasing the flow of the positive electrolyte by increasing the pump speed of the positive electrolyte pump 32 and increasing back pressure at the outlet of the positive electrode compartment 22 may be less desirable than other methods of increasing the cross-over pressure because pump parasitic losses may be increased.

Next at 640, method 600 continues by determining if a redox flow battery system is operating in charge mode. If the redox flow battery system is operating in charge mode, hydrogen gas in the negative electrode compartment may be generated at higher rates than when not operating in charge mode, and a risk of gas bubble infiltration and entrapment in the pores of the separator increases. Accordingly, in response to operating in charging mode, the controller may at 644 set the cross-over pressure to a threshold cross-over pressure. The threshold cross-over pressure may be a predetermined cross-over pressure selected to be high enough in order to purge gas bubbles infiltrated and trapped in the separator 24, but far enough below the break-through pressure to mitigate break-through. As described above, the controller 88 may increase the cross-over pressure by one or both of increasing a pressure at the positive electrode compartment 22 and decreasing a pressure at the negative electrode compartment 20. For instance, to increase the pressure at the positive electrode compartment 22, the controller 88 may perform one or more of increasing a speed of positive electrolyte pump 32 to increase a flow rate to the positive electrode compartment and reducing outlet flow from the positive electrode compartment 22 by throttling a back flow pressure regulating device 23. Furthermore, to decrease the pressure at the negative electrode compartment 20, the controller 88 may perform one or more of increasing a speed of vacuum pump 25 to increase a vacuum to the negative electrode compartment 20, decrease a speed of negative electrolyte pump 30 to decrease an electrolyte flow rate to the negative electrode compartment, and increasing outlet flow from the negative electrode compartment 20 by throttling a back flow pressure regulating device 21. By increasing a cross-over pressure while maintaining the cross-over pressure less than the break-through pressure, the controller 88 can maintain a resistance of the redox flow battery while mitigating mixing of the negative electrolyte with the positive electrolyte due to break-through.

For the case where the redox flow battery system is not operating in charge mode at 640, and continuing from 644 after setting the cross-over pressure to the threshold cross-over pressure, method 600 may continue at 650, where the controller 88 determines if an increase in the redox flow battery resistance is greater than a threshold resistance increase. The threshold increase in resistance may correspond to an increase in the resistance beyond typical operational fluctuations and noise. For example, an increase in resistance beyond the threshold resistance may indicate the infiltration of gas bubbles in the separator 24. Furthermore, the threshold increase in resistance may be measured over a threshold duration, such that the threshold increase in resistance may correspond to a threshold rate of increase in the resistance, which may be characteristic of gas infiltration into the separator 24. In response to the increase in resistance greater than the threshold increase in resistance, the controller 88 may increase the cross-over pressure at 654 while maintaining the cross-over pressure less than the break-through pressure, as describe above for 644. In this way, even outside of operation in charge mode, the controller 88 can maintain resistance of the redox flow battery, while mitigating break-through, thereby increasing performance of the redox flow battery.

In one example, the redox flow battery threshold increase in resistance may be indicated by a predetermined look up table characteristic of the redox flow battery system for battery charge voltage and battery charge current at a given state of charge. When the redox flow battery charge current is lower at a given charge voltage or the redox flow battery charge voltage is higher for a given charge current than indicated in the look-up table, the redox flow battery resistance increase may be higher than the threshold resistance.

Next, at 660, for the case where there is no increase in the resistance greater than the threshold increase at 650, including a rate of increase in resistance greater than the threshold rate of increase in resistance, and continuing from 654, controller 88 may determine if the increase in the resistance of the redox flow battery is less than a lower threshold resistance increase. The lower threshold resistance increase may correspond to a lower resistance increase over a threshold duration indicating a lower risk of gas infiltration into the separator. When the resistance increase is less than the lower threshold resistance increase, controller 88 may responsively reduce the cross-over pressure, while maintaining the cross-over pressure greater than a lower threshold cross-over pressure. The lower threshold cross-over pressure may correspond to a cross-over pressure below which the risk of gas infiltration into the separator is high. In one example, the lower threshold cross-over pressure may correspond to 0, such that the positive electrode compartment pressure is maintained greater than or equal to the negative electrode compartment pressure during operation of the redox flow battery system. The controller 88 may reduce the cross-over pressure by performing one or more of reducing the speed of positive electrolyte pump 32, increasing outlet flow from the positive electrode compartment 22 by throttling back flow pressure regulating device 23, increasing the speed of negative electrolyte pump 30, reducing a speed of vacuum pump 25, and decreasing outlet flow from the negative electrode compartment 20 by throttling back flow pressure regulating device 21. Reducing the cross-over pressure while maintaining the cross-over pressure greater than the lower threshold cross-over pressure may reducing energy consumption, thereby reducing operating costs of the redox flow battery system. After 664 and for the case where the resistance increase is greater than the lower threshold increase in resistance at 660, method 600 ends.

Thus, a method of operating a redox flow battery includes, in response to an increase in a resistance of the redox flow battery being greater than a threshold increase in resistance, increasing a cross-over pressure by performing one or more of, increasing a positive electrode compartment pressure of the redox flow battery, and reducing a negative electrode compartment pressure of the redox flow battery, wherein the cross-over pressure equals the negative electrode compartment pressure subtracted from the positive electrode compartment pressure. A first example of the method includes in response to charging the redox flow battery system, increasing the cross-over pressure to a threshold cross-over pressure by performing one or more of, increasing the positive electrode compartment pressure, and reducing the negative electrode compartment pressure. A second example of the method optionally includes the first example, and further includes wherein the threshold cross-over pressure is less than a break-through pressure of a separator membrane of the redox flow battery. A third example of the method optionally includes one or more of the first and second examples, and further includes wherein decreasing the negative electrode compartment pressure includes increasing a speed of a vacuum pump fluidly coupled to the negative electrode compartment. A fourth example of the method optionally includes one or more of the first through third examples, and further includes wherein decreasing the negative electrode compartment pressure includes reducing a speed of an electrolyte pump supplying negative electrolyte to the negative electrode compartment. A fifth example of the method optionally includes one or more of the first through fourth examples, and further includes wherein decreasing the negative electrode compartment pressure includes throttling a back flow pressure regulating device fluidly coupled to an outlet of the negative electrode compartment to increase an outlet flow of negative electrolyte from the negative electrode compartment. A sixth example of the method optionally includes one or more of the first through fifth examples, and further includes wherein increasing the positive electrode compartment pressure includes increasing a speed of an electrolyte pump supplying positive electrolyte to the positive electrode compartment. A seventh example of the method optionally includes one or more of the first through sixth examples, and further includes wherein increasing the positive electrode compartment pressure includes throttling a back flow pressure regulating device fluidly coupled to an outlet of the positive electrode compartment to decrease an outlet flow of positive electrolyte from the positive electrode compartment.

Thus, a redox flow battery system includes negative and positive electrode compartments electrically separated by an ionically-permeable separator, negative and positive electrolyte pumps supplying negative and positive electrolyte to the negative and positive electrode compartments, respectively, and a controller, including executable instructions residing in memory on-board the controller to, in response to charging the redox flow battery system, increasing a cross-over pressure by performing one or more of, increasing a positive electrode compartment pressure, and reducing a negative electrode compartment pressure, wherein the cross-over pressure equals the negative electrode compartment pressure subtracted from the positive electrode compartment pressure. In a first example of the redox flow battery system, the executable instructions to reduce the negative electrode compartment pressure include reducing a speed of the negative electrolyte pump. A second example of the redox flow battery system optionally includes the first example, and further includes a vacuum pump fluidly coupled to the negative electrode compartment, wherein the executable instructions to reduce the negative electrode compartment pressure include increasing a speed of the vacuum pump. A third example of the redox flow battery system optionally includes one or more of the first and second examples, and further includes wherein the executable instructions to increase the positive electrode compartment pressure include increasing a speed of the positive electrolyte pump. A fourth example of the redox flow battery system optionally includes one or more of the first through third examples, and further includes a back flow pressure regulating device fluidly coupled to an outlet of the positive electrode compartment, wherein the executable instructions to increase the positive electrode compartment pressure include decreasing an outlet flow rate of positive electrolyte from the positive electrode compartment by throttling the back flow pressure regulating device. A fifth example of the redox flow battery system optionally includes one or more of the first through fourth examples, and further includes wherein the ionically-permeable separator includes a hybrid membrane, the hybrid membrane including a microporous membrane layer facing the negative electrode compartment and an ion-exchange membrane layer facing the positive electrode compartment. A sixth example of the redox flow battery system optionally includes one or more of the first through fifth examples, and further includes wherein the threshold cross-over pressure is from 3 to 7 kPa.

Thus, a method of operating a redox flow battery includes maintaining a positive electrode compartment pressure greater than a negative electrode compartment pressure, and maintaining a cross-over pressure less than a membrane break-through pressure, wherein the cross-over pressure equals the negative electrode compartment pressure subtracted from the positive electrode compartment pressure. A first example of the method includes in response to an increase in a resistance of the redox flow battery being less than a threshold increase, reducing the cross-over pressure while maintaining the cross-over pressure greater than a lower threshold cross-over pressure. A second example of the method optionally includes the first example and further includes in response to the increase in the resistance of the redox flow battery begin greater than the threshold increase, increasing the cross-over pressure while maintaining the cross-over pressure less than the membrane break-through pressure. A third example of the method optionally includes one or more of the first and second examples and further includes wherein the increase in the resistance of the redox flow battery is determined over a threshold duration. A fourth example of the method optionally includes one or more of the first through third examples and further includes wherein the increase in the resistance of the redox flow battery is determined outside of a charging mode.

In this way, a technical effect of reducing ionic resistance across the separator can be achieved by reducing gas bubbles trapped therein while reducing separator breakthrough, thereby increasing performance of the redox flow battery system.

Note that the example control and estimation routines included herein can be used with various battery configurations. The control methods and routines disclosed herein may be stored as executable instructions in non-transitory memory and may be carried out by the control system including the controller in combination with the various sensors, actuators, and other battery hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various battery hardware components in combination with the electronic controller.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a redox flow battery, comprising:
in response to an increase in an electrical resistance of the redox flow battery being greater than a threshold increase in electrical resistance, increasing a cross-over pressure by performing one or more of,
increasing a positive electrode compartment pressure of the redox flow battery, and
reducing a negative electrode compartment pressure of the redox flow battery, wherein
the cross-over pressure equals the negative electrode compartment pressure subtracted from the positive electrode compartment pressure.

2. The method of claim 1, further comprising, in response to charging the redox flow battery, increasing the cross-over pressure to a threshold cross-over pressure by performing one or more of increasing the positive electrode compartment pressure and reducing the negative electrode compartment pressure.

3. The method of claim 2, wherein the threshold cross-over pressure is less than a break-through pressure of a separator membrane of the redox flow battery.

4. The method of claim 3, wherein decreasing the negative electrode compartment pressure includes increasing a speed of a vacuum pump fluidly coupled to a negative electrode compartment.

5. The method of claim 4, wherein decreasing the negative electrode compartment pressure includes reducing a speed of an electrolyte pump supplying negative electrolyte to the negative electrode compartment.

6. The method of claim 5, wherein decreasing the negative electrode compartment pressure includes throttling a back flow pressure regulating device fluidly coupled to an outlet of the negative electrode compartment to increase an outlet flow of negative electrolyte from the negative electrode compartment.

7. The method of claim 6, wherein increasing the positive electrode compartment pressure includes increasing a speed of an electrolyte pump supplying positive electrolyte to a positive electrode compartment.

8. The method of claim 7, wherein increasing the positive electrode compartment pressure includes throttling a back flow pressure regulating device fluidly coupled to an outlet of the positive electrode compartment to decrease an outlet flow of positive electrolyte from the positive electrode compartment.

9. A redox flow battery system, comprising:
negative and positive electrode compartments electrically separated by an ionically-permeable separator;
wherein the ionically-permeable separator comprises a hybrid membrane, the hybrid membrane comprising a microporous membrane layer facing the negative electrode compartment and an ion-exchange membrane layer facing the positive electrode compartment;
negative and positive electrolyte pumps supplying negative and positive electrolyte to the negative and positive electrode compartments, respectively;
and a controller, including executable instructions residing in memory on-board the controller to:
in response to charging the redox flow battery system, increasing a cross-over pressure by performing one or more of,
increasing a positive electrode compartment pressure, and
reducing a negative electrode compartment pressure, wherein
the cross-over pressure equals the negative electrode compartment pressure subtracted from the positive electrode compartment pressure.

10. The redox flow battery system of claim 9, wherein the executable instructions to reduce the negative electrode compartment pressure include reducing a speed of the negative electrolyte pump.

11. The redox flow battery system of claim 10, further comprising a vacuum pump fluidly coupled to the negative electrode compartment, wherein the executable instructions to reduce the negative electrode compartment pressure include increasing a speed of the vacuum pump.

12. The redox flow battery system of claim 11, wherein the executable instructions to increase the positive electrode compartment pressure include increasing a speed of the positive electrolyte pump.

13. The redox flow battery system of claim 12, further comprising a back flow pressure regulating device fluidly coupled to an outlet of the positive electrode compartment, wherein the executable instructions to increase the positive electrode compartment pressure include decreasing an outlet flow rate of positive electrolyte from the positive electrode compartment by throttling the back flow pressure regulating device.

14. The redox flow battery system of claim 13, wherein the ionically-permeable separator includes the hybrid membrane, the hybrid membrane including the microporous membrane layer facing the negative electrode compartment and the ion-exchange membrane layer facing the positive electrode compartment.

15. The redox flow battery system of claim 13, wherein a threshold cross-over pressure is from 3 to 7 kPa.

16. A method of operating a redox flow battery, including:
maintaining a positive electrode compartment pressure greater than a negative electrode compartment pressure, and
maintaining a cross-over pressure less than a membrane break-through pressure, wherein the cross-over pressure equals the negative electrode compartment pressure subtracted from the positive electrode compartment pressure; and
in response to an increase in an electrical resistance of the redox flow battery being less than a threshold increase, reducing the cross-over pressure while maintaining the cross-over pressure greater than a lower threshold cross-over pressure.

17. The method of claim 16, further comprising, in response to the increase in the electrical resistance of the redox flow battery being greater than the threshold increase, increasing the cross-over pressure while maintaining the cross-over pressure less than the membrane break-through pressure.

18. The method of claim 17, wherein the increase in the electrical resistance of the redox flow battery is determined over a threshold duration.

19. The method of claim 17, wherein the increase in the electrical resistance of the redox flow battery is determined outside of a charging mode.

* * * * *